US011893209B2

(12) United States Patent
Ihns (10) Patent No.: US 11,893,209 B2
(45) Date of Patent: Feb. 6, 2024

(54) CONTROL AND DISPLAY UNIT FOR ANTI-MISSILE COUNTERMEASURES

(71) Applicant: Avalex Technologies LLC, Gulf Breeze, FL (US)

(72) Inventor: Jurgen R. Ihns, Gulf Breeze, FL (US)

(73) Assignee: Mercury Systems, Inc., Andover, MA (US)

(*) Notice: Subject to any disclaimer, the term of this patent is extended or adjusted under 35 U.S.C. 154(b) by 0 days.

(21) Appl. No.: 17/850,229

(22) Filed: Jun. 27, 2022

(65) Prior Publication Data

US 2022/0413683 A1 Dec. 29, 2022

Related U.S. Application Data

(60) Provisional application No. 63/215,666, filed on Jun. 28, 2021.

(51) Int. Cl.
*G06F 3/04812* (2022.01)
*G06F 3/04817* (2022.01)
(Continued)

(52) U.S. Cl.
CPC ........... *G06F 3/04817* (2013.01); *B64D 1/02* (2013.01); *F42B 12/70* (2013.01); *G06F 3/04812* (2013.01)

(58) Field of Classification Search
CPC ..................... G06F 3/04817; G06F 3/04812
See application file for complete search history.

(56) References Cited

U.S. PATENT DOCUMENTS 3,775,690 A 11/1973 Ravenelle et al.
4,205,271 A 5/1980 Ogawa
(Continued)

OTHER PUBLICATIONS

Sidewinder, DCS: F/A-18C Countermeasure Tutorial, Jul. 10, 2018, 8 pages, https://www.google.com/search?tbm=vid&q=f18+hornet+countermeasures&sa=X&ved=2ahUKEwiL-_iTrJj-AhVVD1kFHbLOBmUQ8ccDegQIChAJ&biw=1458&bih=782&dpr=1.32#fpstate=ive&vld=cid:33b7c92b,vid:TkUKvITixfE (Year: 2018).*

(Continued)

*Primary Examiner* — Jeanette J Parker
(74) *Attorney, Agent, or Firm* — Bryan W. Bockhop; Bockhop Intellectual Property Law, LLC (57) ABSTRACT

In a countermeasures control interface for use in deploying countermeasures in response to user commands, which are deployed from a first countermeasure dispenser that deploys a first type of countermeasure and a second countermeasure dispenser that deploys a second type of countermeasure different from the first type. A user interface receives user commands regarding countermeasures deployment and includes a display that shows a user-selectable image formats. At least one of the user-selectable image formats includes a graphic representation of a loadout of the first countermeasure dispenser and the second countermeasure dispenser, as well as a graphical representation of currently-available countermeasures deployment options. The user interface also receives input regarding a user countermeasure deployment choice and generates a signal corresponding to the countermeasure deployment choice. An electronic circuit controls the display and generates the user-selectable image formats, receives the countermeasure deployment choice from the user interface and activates the countermeasure dispensers.

22 Claims, 9 Drawing Sheets

(51) Int. Cl.
    *B64D 1/02*         (2006.01)
    *F42B 12/70*       (2006.01)

(56) References Cited

U.S. PATENT DOCUMENTS

| | | | |
|---|---|---|---|
| 4,651,282 | A | 3/1987 | Robinson et al. |
| 5,574,458 | A * | 11/1996 | Tran .......................... G01S 7/38 |
| | | | 342/13 |
| 6,901,331 | B1 | 5/2005 | Beckmann et al. |
| 9,223,463 | B1 * | 12/2015 | Kawaguchi ........... G06F 3/0481 |
| 9,293,053 | B2 | 3/2016 | Ihns |
| 9,483,949 | B2 | 11/2016 | Ihns |
| 2006/0164261 | A1 * | 7/2006 | Stiffler ................... G01C 23/00 |
| | | | 709/201 |
| 2015/0331417 | A1 * | 11/2015 | Theiss ................ G05B 19/0428 |
| | | | 702/122 |

OTHER PUBLICATIONS

Dailyairforce, F-35 Simulator—AA and AG Modes, Nov. 12, 2010, 7 pages, https://www.youtube.com/watch?v=5IPZDc8mzsY&t=43s (Year: 2010).*
Bae Systems: "Ale-47"; Feb. 18, 2019.
Terma: "ALQ-213(V) Electronic Warfare Management Unit"; Mar. 2, 2015.
Avalex Technologies: "ACM9443 Communications Management Unit"; Jul. 29, 2020.
hoggitworld.com: "Countermeasures"; Mar. 23, 2021.

* cited by examiner

CONTROL AND DISPLAY UNIT FOR ANTI-MISSILE COUNTERMEASURES

CROSS-REFERENCE TO RELATED APPLICATION(S)

This application claims the benefit of U.S. Provisional Patent Application Ser. No. 63/215,666, filed Jun. 25, 2021, the entirety of which is hereby incorporated herein by reference.

BACKGROUND OF THE INVENTION

1. Field of the Invention

The present invention relates to countermeasures systems and, more specifically to a unit for displaying information about a countermeasures system in controlling a counter measures system.

2. Description of the Related Art

Aircraft, as well as ships and land vehicles, that operate in combat zones are typically equipped with countermeasures systems that are used to confuse weapons fired at the aircraft. Such countermeasures systems typically include things like chaff and flares. Chaff is a radar countermeasure that generates a cloud of small, thin pieces of aluminum or metallized fibers. The cloud can be mistaken for a target by radar-guided weapons, such as missiles. Flares generate a heat signature similar to that of the frame deploying it and are used to lead heat-seeking weapons away from the airframe or other type of vehicle. Other types of countermeasures include expendable decoys and radar jamming circuits.

Existing countermeasures systems include a plurality of countermeasures dispensers (such as chaff dispensers and flare dispensers), which are activated by a programmer. The programmer is a control circuit with signal outputs that cause the dispensers to launch their countermeasures when activated. The programmer can be programmed with advanced threat evaluation routines that determine the type of incoming threat and with automatic response routines that launch specific combinations of countermeasures tailored to the type of incoming threat. The programmer provides data outputs and receives control inputs from a control unit that provides information to a user and that receives control inputs from the user.

Many NATO aircraft are equipped with an ALE-47 countermeasure dispenser system, which has been employed on the following airframes: F-16, F/A-18, C-17, CH-47 and UH-60. The ALE-47 is integrated with an aircraft's radar warning receivers, missile warning receivers and other electronic warfare sensors. When these sensors detect a threat, the countermeasure dispenser system can automatically launch countermeasures such as flares and chaff in pre-programmed mixes that correspond to the threat. The ALE-47 includes a cockpit control unit, sequencer units, countermeasure dispensers and an optional programmer. The cockpit control unit provides an interface with the pilot. The sequencer units control the dispensers. In the ALE-47, each dispenser holds up to five different types of countermeasures and the whole system can accommodate up to 32 dispensers on certain aircraft. The ALE-47 also includes a jettison switch, the activation of which causes the jettison of items that could inhibit the airframe in certain situations. For example, external fuel tanks can be jettisoned when entering a dogfight so as to reduce the airframe's drag and weight.

Existing control units typically include several dedicated switches to allow a pilot to cause deployment of selected countermeasures responses. Such control units also include test display to show the types and numbers of available countermeasures.

Typically, pilots also use an electronic warfare management system (such as the ALQ-213) that displays information from electronic warfare systems such as warning systems and jammers. Pilots often use information from both an electronic warfare management system and a countermeasures system to make threat response decisions and then they provide control inputs to both systems to execute those decisions.

Also, existing units use text displays, which require the pilot to expend mental energy and spend time comprehending the data while making countermeasures deployment decisions. Thus, the pilot may be temporarily distracted from other important events occurring configurations and performing system upgrades often requires changing hardware used in the control unit, which can be time consuming and expensive.

Therefore, there is a need for an integrated countermeasures and electronic warfare management system that provides a user with an intuitive interface for information and control.

There is also a need for a countermeasures system that can be easily reconfigured by software updates.

SUMMARY OF THE INVENTION

The disadvantages of the prior art are overcome by the present invention which, in one aspect, is a countermeasures control interface for use in deploying countermeasures from a frame in response to commands from a user. The countermeasures are deployed from a first countermeasure dispenser that deploys a first type of countermeasure and a second countermeasure dispenser that deploys a second type of countermeasure that is different from the first type of countermeasure. A programmable user interface, which is in communication with the control unit, receives the commands from the user regarding deployment of the countermeasures. The user interface includes a display that shows a plurality of user-selectable image formats, in which at least one of the user-selectable image formats includes a graphic representation of a current loadout of the first countermeasure dispenser, a graphic representation of a current loadout of the second countermeasure dispenser and a graphic representation of a plurality of currently-available options for deploying countermeasures. The user interface also includes a user input device that receives input regarding a countermeasure deployment choice from the user and generates a signal corresponding to the countermeasure deployment choice. An electronic circuit controls the display so as to generate the plurality of user-selectable image formats and that receives the signal corresponding to the countermeasure deployment choice from the user interface and selectively activates both the first countermeasure dispenser and the second countermeasure dispenser so as to cause deployment of the countermeasures according to the countermeasure deployment choice.

In another aspect, the invention is a countermeasures device for deploying counter measures from a frame in response to commands from a user, in which a first countermeasure dispenser is mounted on the frame and is configured to deploy a first type of countermeasure. A second countermeasure dispenser is mounted on the frame and is configured to deploy a second type of countermeasure that is different from the first type of countermeasure. A control unit selectively activates both the first countermeasure dispenser and the second countermeasure dispenser. A user interface, which is in communication with the control unit, receives the commands from the user regarding deployment of the countermeasures. The user interface includes a display that shows a plurality of user-selectable image formats, in which at least one of the user-selectable image formats includes a graphic representation of a current loadout of the first countermeasure dispenser, a graphic representation of a current loadout of the second countermeasure dispenser and a graphic representation of a plurality of currently-available options for deploying countermeasures; and a user input device that receives input regarding a countermeasure deployment choice from the user and that generates a signal corresponding to the countermeasure deployment choice to the control unit. The control unit controls the display so as to generate the graphic representation.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the representative implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 1:
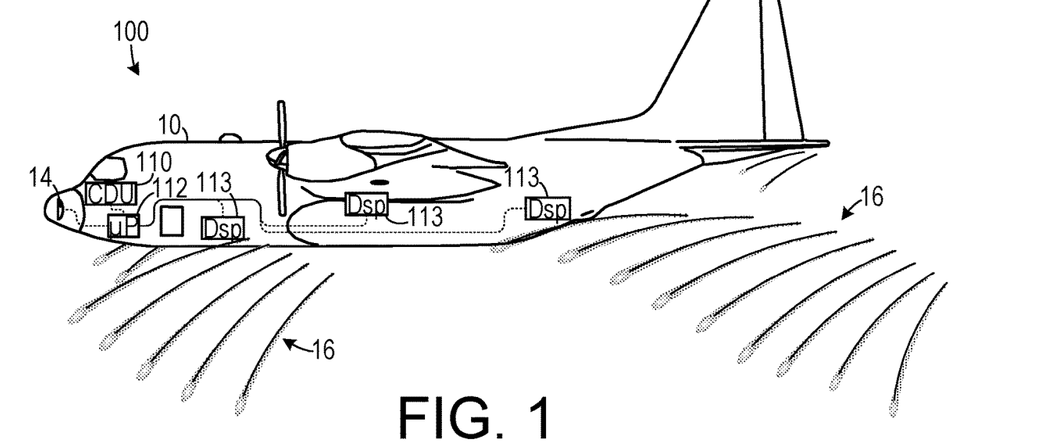
FIG. 1 is a schematic diagram of a countermeasures system employed on an airframe.

As shown in FIG. 1, one embodiment includes a countermeasures system 100 mounted on a vehicle, such as an airframe 10. The countermeasures system 100 includes a plurality of countermeasures dispensers 113 that store and launch countermeasures units 16 such as chaff and flares. The countermeasures dispensers 113 are controlled by a programmer 112 (which can include a microprocessor or microcontroller) that interfaces with a control display unit 110. The countermeasures dispensers 113 can include, for example, chaff launchers 20 and flare launchers 12. Threat sensors, such as radars 14 and threat warning indicators, also interface with the control display unit 110. The control display unit 110 presents information to the user about countermeasures availability and incoming threats, and it also receives user commands for launching countermeasures 16 in response to such threats. Upon the control display unit 110 receiving launching commands from the user, the programmer 112 generates control signals to the dispensers 113 that cause the launching of the selected countermeasures from the frame. Such commands can include preset commands for launching specific combinations ("cocktails") of countermeasures, which can be tailored to specific types of threats.

In one embodiment, the control display unit 110 can be programmed to enter an automatic response mode that causes a predetermined deployment of countermeasures upon detection of a specific threat. For example, if an incoming missile from a known radar guided missile launcher is detected, then the system can be preprogrammed to deploy chaff and activate electronic countermeasures automatically in response.

Figure 2A:
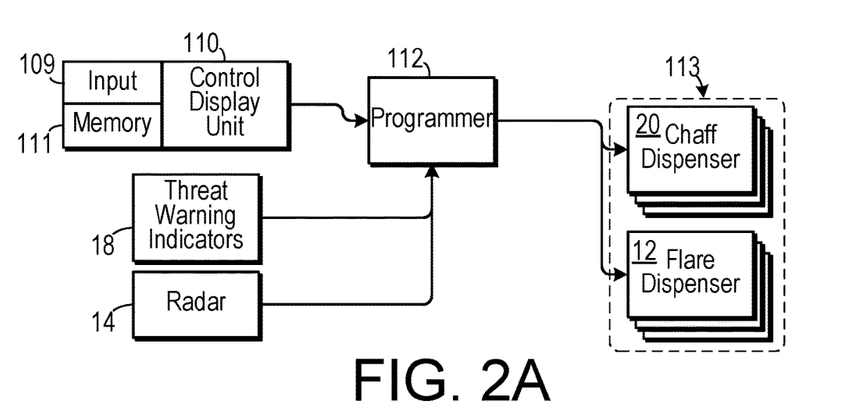
FIG. 2A is a block diagram of an embodiment of a countermeasures system employing a control display unit with and existing programmer.
Figure 2B:
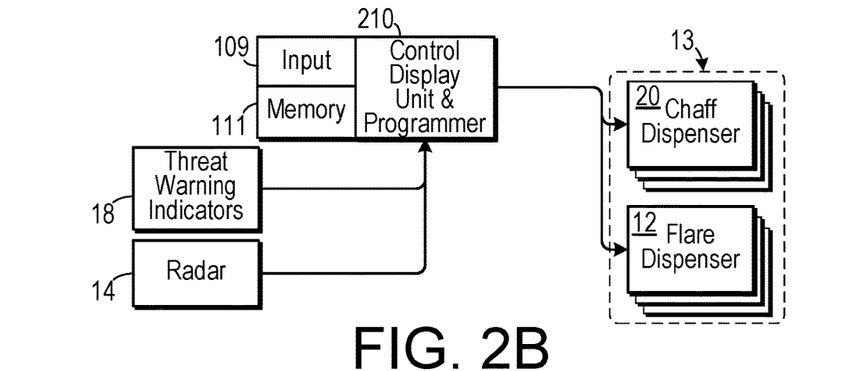
FIG. 2B is a block diagram of an embodiment of a countermeasures system employing an integrated control display and programmer.

In one embodiment, as shown in FIG. 2A, the programmer 112 receives inputs from the threat warning indicators 18 and the radar(s) 14, and controls deployment of the chaff dispensers 20 and the flare dispensers 12. The programmer 112, which can be a component of an ALE-47 type system, interfaces with the control display unit 110, which acts as the primary cockpit interface device to the programmer 112. As shown in FIG. 2B, the functions of the control display unit and the programmer can be combined into a combined control display unit—programmer unit 210, which can be employed in airframes that do not already have or require a separate programmer. The control display unit 110 can include a program storage memory 111 that stores a program that controls the electronic circuit. An input interface 109 (e.g., a USB interface, a microSD memory card reader, etc.) can be provided for uploading software updates and changes to the program in the program storage memory 111. This interface 109 allows changing the functionality of the user interface is changeable by uploading an updated program to the memory 111.

Figure 3A:
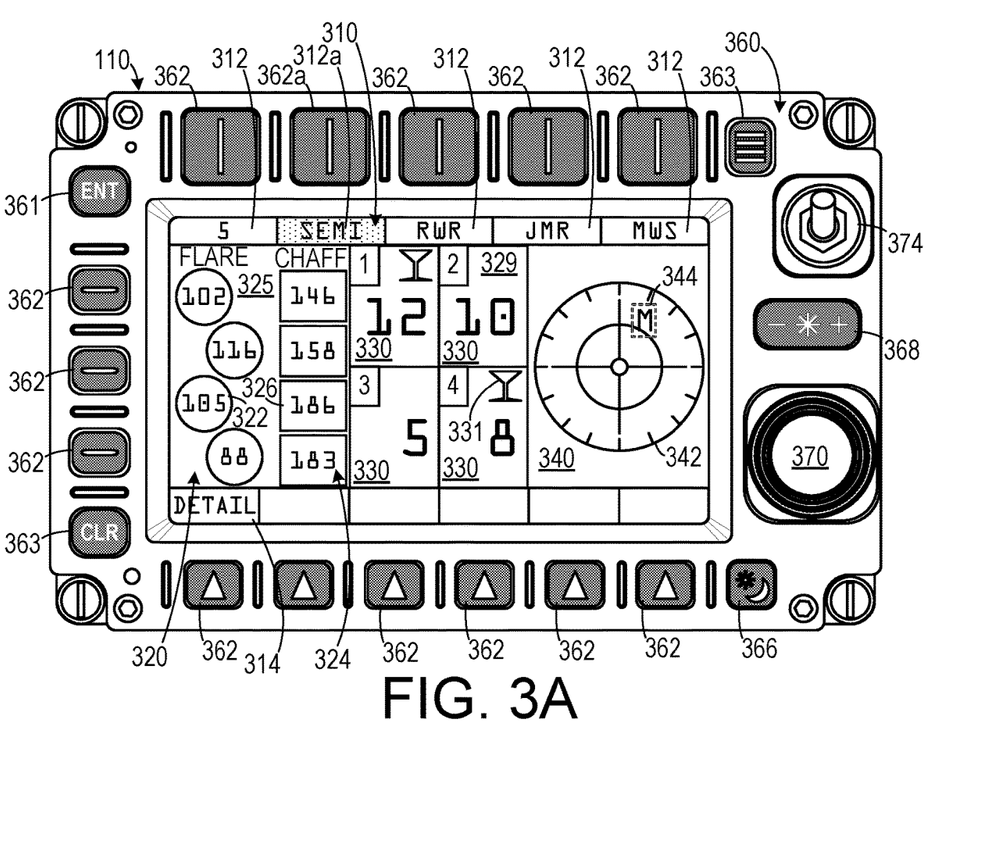
FIG. 3A is a schematic diagram showing a control display unit on which a loadout overview is shown on the display.

As shown in FIG. 3A, one example of a countermeasures control interface 110 that can be employed with the system in deploying countermeasures from an airframe includes a front panel 360 that includes a display screen 310 (such as an LED screen, an LCD screen, a plasma screen, or one of the many types of display screens employed in airframe applications) that is configured to display graphical representations of important data regarding the countermeasures loadout. In this example, two types of countermeasures are used: flares and chaff. The front panel 360 also includes a plurality of user input controls, such as selection hard buttons 362 disposed linearly along the edges of the screen and adjacent to display mode selection labels 312 displayed on the screen 310, turnable knobs 370 that can be used for scrolling through ladder soft key menus, a jettison switch 374, a screen brightness control switch 368 and a night mode switch 366. The screen 310 may also include a touch sensitive display that allows the pilot to select certain actions by touching corresponding areas of the screen 310. Enter ("ENT") 361 and clear ("CLR") 363 buttons can also be provided to allow the pilot to enter and clear data. A menu button 364 may be provided to cause display of a menu used in selecting display configurations and performing administrative tasks such as uploading program updates, etc.

A programmable user interface allows the user to select the data displayed and to input commands regarding deployment of countermeasures. The display mode selections 312 allow the user (e.g., the pilot) to select the type and arrangement of information and control inputs that are displayed on the screen 310. In the example shown, the pilot can depress selection hard buttons 362 adjacent to "5" mode to show a predetermined countermeasures configuration; SEMI mode to show a mixture of loadout data for flares 320 and chaff 324, countermeasures combination ("cocktail") selections 330, and threat location data 340; radar warning receiver ("RWR") mode to show radar warning data on the display screen 310; jammer ("JMR") mode to show jammer data; and missile warning system ("MWS") mode to show information from the missile warning system. A detail soft key 314 allows the pilot to indicate the granularity of detail to be shown. The pilot can also jettison predetermined items (e.g., all available flares, external fuel tanks, missiles and/or bombs) by flipping the jettison switch 374 in response to current combat or landing conditions.

In the example shown, the pilot has selected the "SEMI" mode by depressing the hard button 362a adjacent to the "SEMI" label 312a displayed on the display screen 312. In this mode three panels are displayed on the screen 310. The leftmost panel 325 shows a graphical loadout of the current status 320 of each flare launcher and each chaff launcher 324. The different types of launchers may be represented by different shapes (e.g., circles for flares and rectangles for chaff) to facilitate easy recognition by the pilot. For example, in this example launcher 322 currently has 105 flares available and launcher 326 currently has 186 chaff units available. The center panel 329 shows four different available countermeasures deployment schemes 330 that the pilot can select by touching the displayed scheme. For example, the pilot can see that deployment scheme 4 has eight units available for deployment and the image of the cocktail glass 331 indicates that scheme 4 is a mixture of different countermeasures types that will be launched according to a predetermined launch pattern. The pilot's touching in the scheme 4 rectangle will cause a scheme 4 cocktail to launch according to the predetermined pattern. The pilot will have memorized each deployment scheme as part of the pilot's training. The rightmost panel 340 shows a polar coordinate image 342 that gives an indication of detected threats by showing a bearing and range of the threat with respect to the frame. They type of threat can be indicated by an icon, such as a caricature of the threat or a letter indicating the type of threat. In the example shown, an incoming missile has been detected near the one o'clock position as indicated by an "M" shown in a box.

Figure 3B:
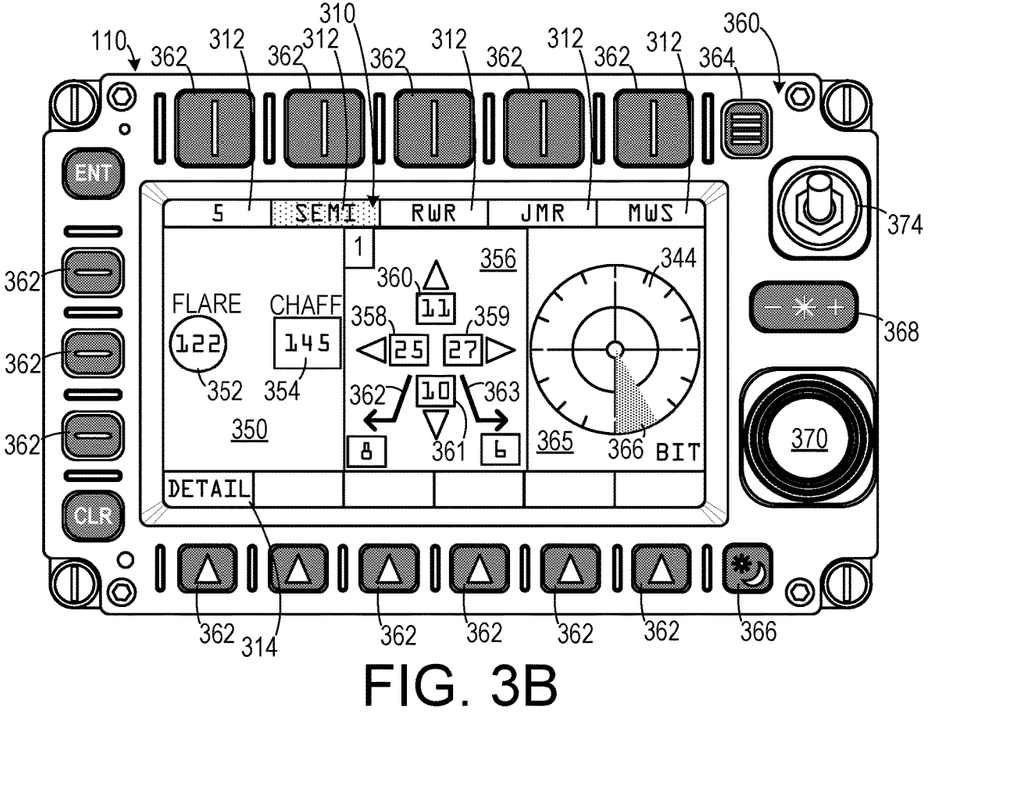
FIG. 3B is a schematic diagram showing a control display unit on which a detail of a loadout overview is shown on the display.

As shown in FIG. 3B, the pilot can change the display mode to show a coarser degree of granularity. In this example, the leftmost panel 350 shows the total flare availability 352 (which, in the example shown is 122 units) and the total chaff availability 354 (which, in the example shown is 145 units). The center panel 356 shows asset availability of the forward launchers 360, asset availability of the aft launchers 361, asset availability of the port launchers 358, asset availability of the starboard launchers 3359, asset availability of the port quarter launchers 362, and asset availability of the starboard quarter launchers 363. The rightmost panel 365 shows a polar coordinate image 344 indicating the directionality of active electronic countermeasures 366.

Figure 3C:
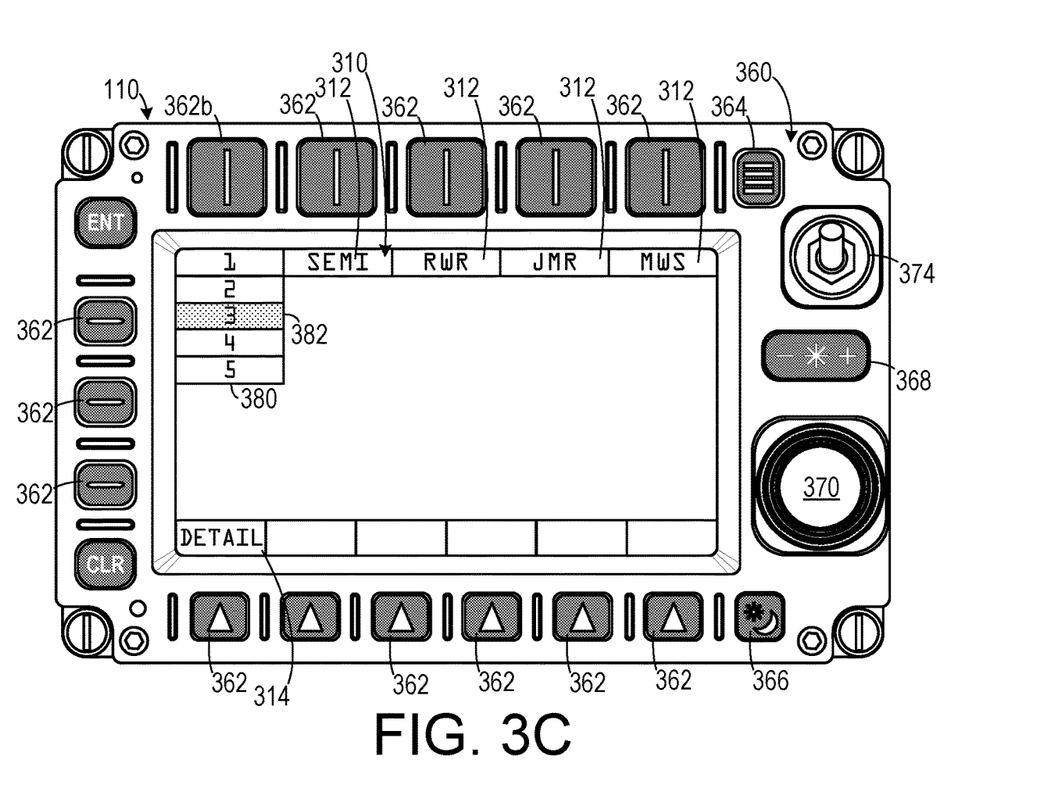
FIG. 3C is a schematic diagram showing a control display unit showing a detail of a ladder soft key.
Figure 4A:
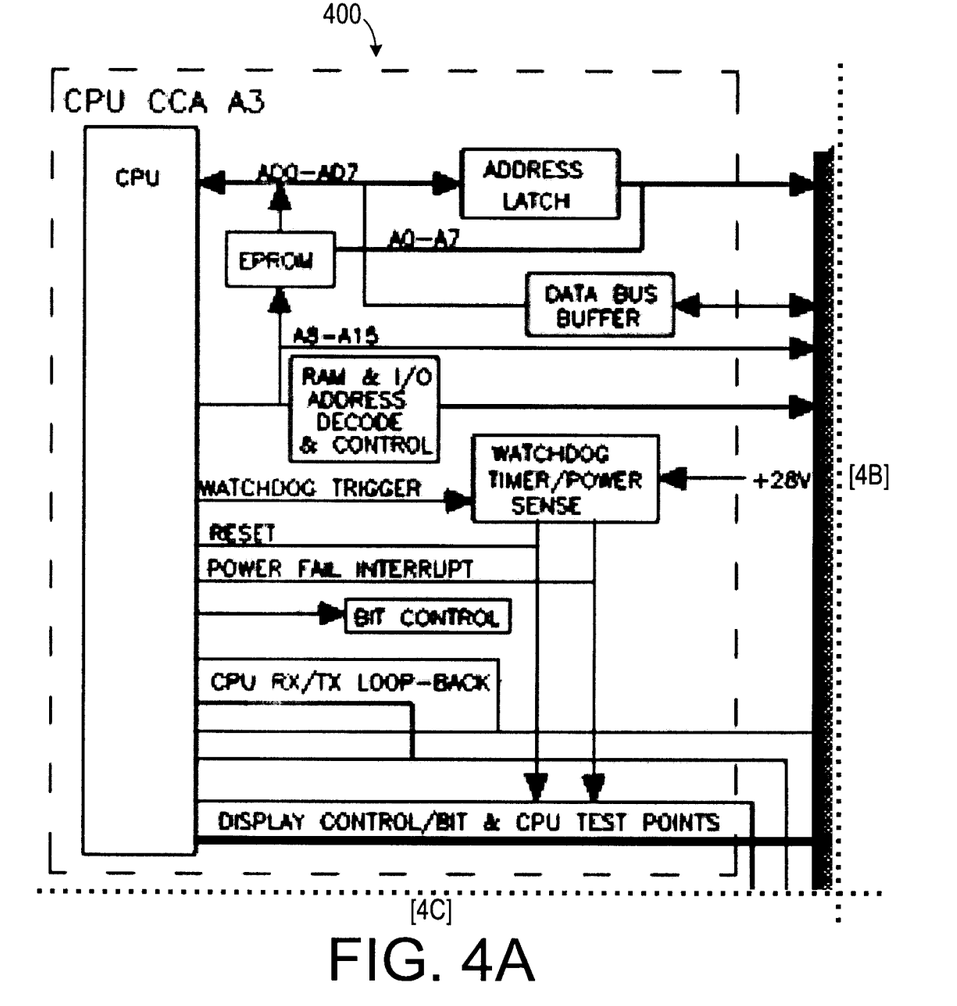
FIGS. 4A-4D are sections of a block diagram of one embodiment.
Figure 4B:
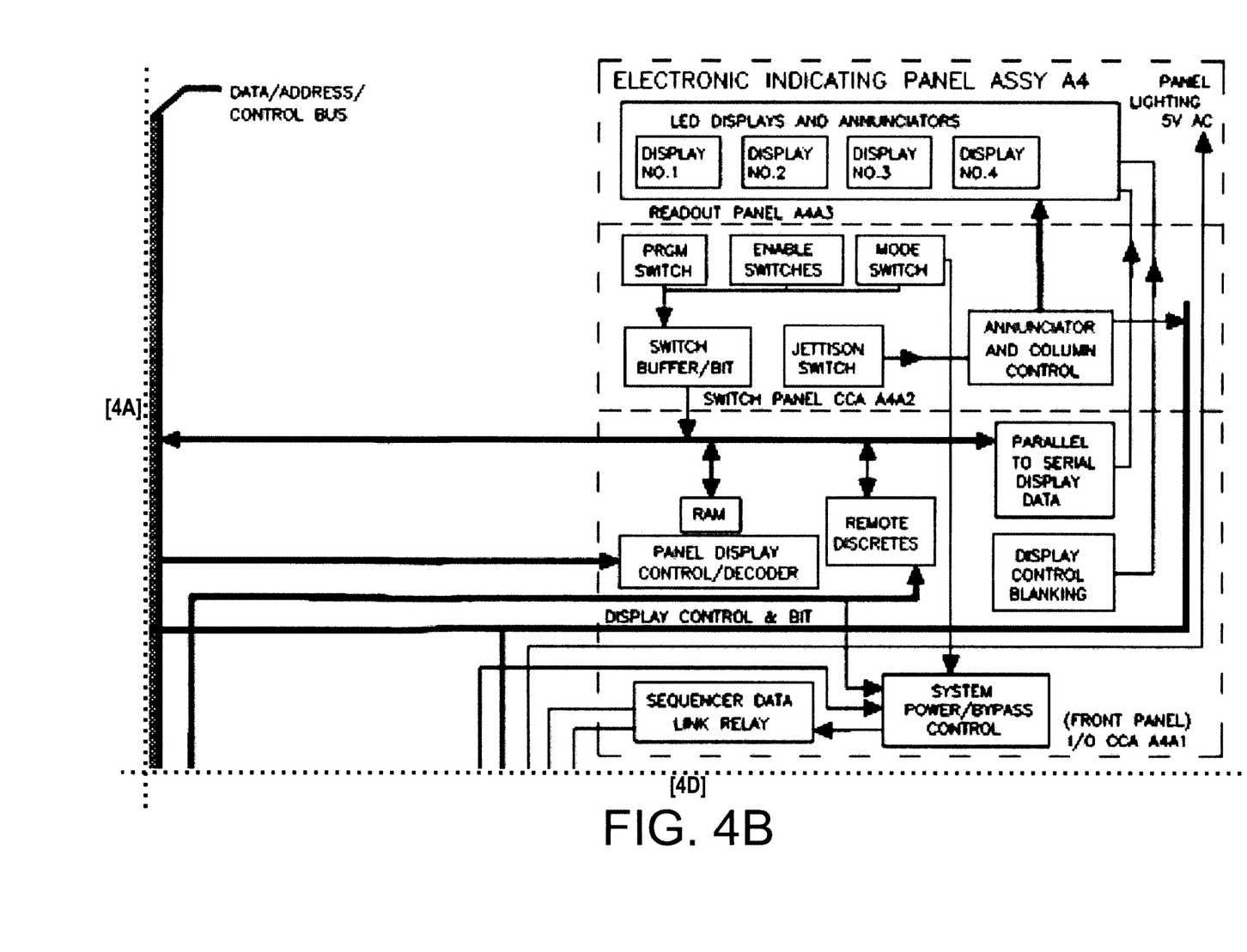
Figure 4C:
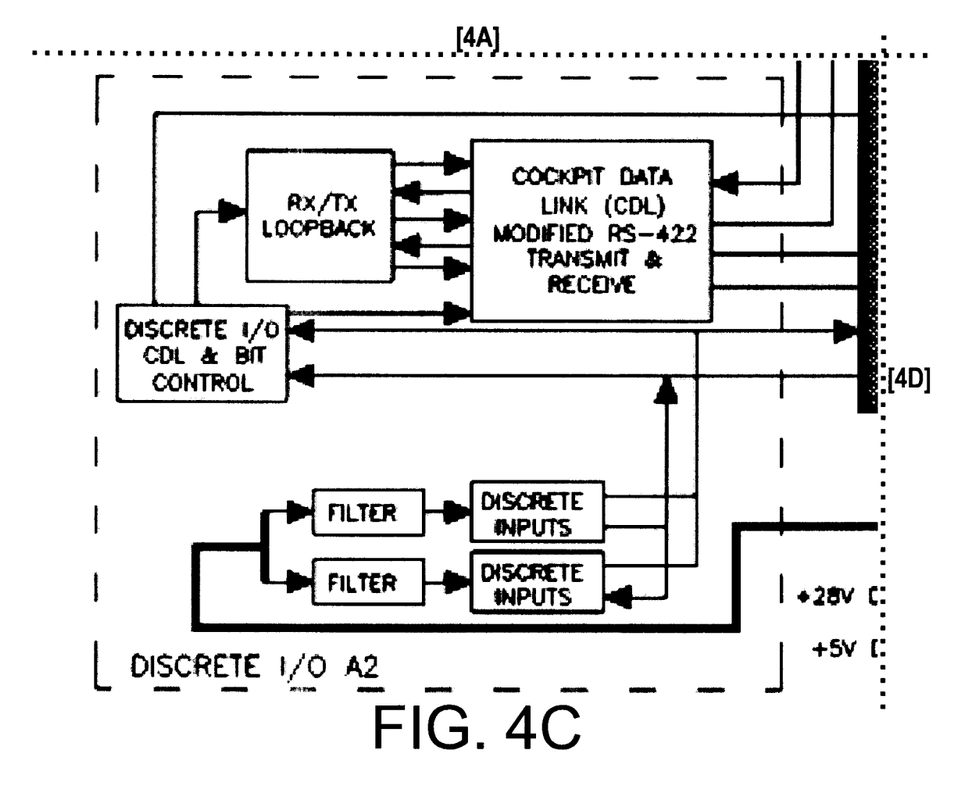
Figure 4D:
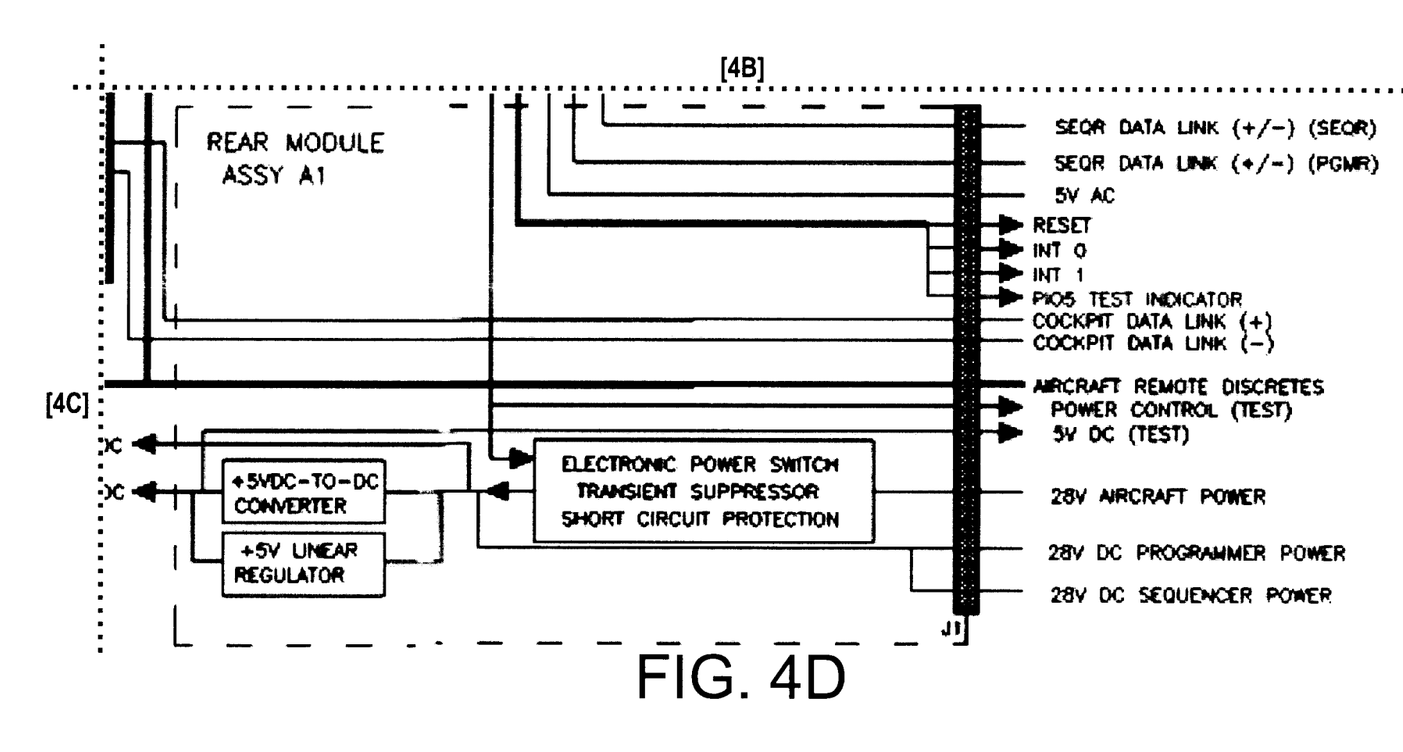

As shown in FIG. 3C, the pilot can select a hard key 362b to display a ladder soft key menu 380. The pilot can then use the knob 370 to scroll to a selected predetermined countermeasures configuration. In the example shown, configuration "3" 382 has been selected, which is indicated by changing a visually perceptible attribute (e.g., color, texture, brightness, etc.) for the selected configuration in the ladder menu 380.

One representative example of an electronic schematic diagram 400 for the control display unit is shown in FIGS. 4A-4D.

Figure 5A:
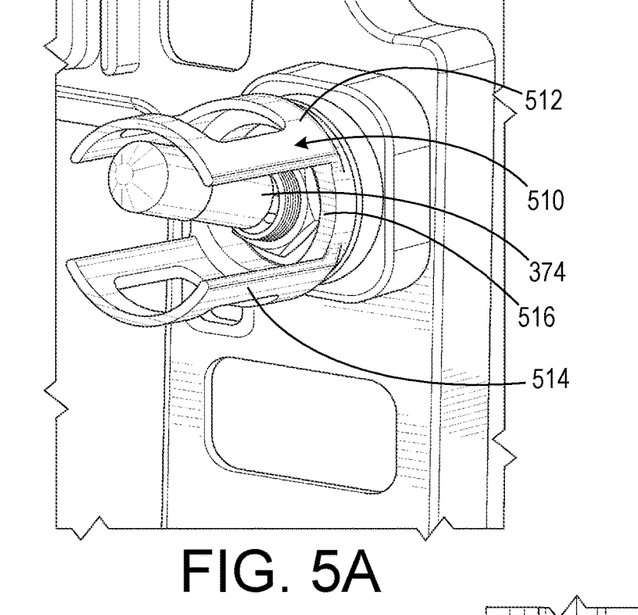
FIGS. 5A-5B are two views of a jettison toggle switch with a toggle switch guard.
Figure 5B:
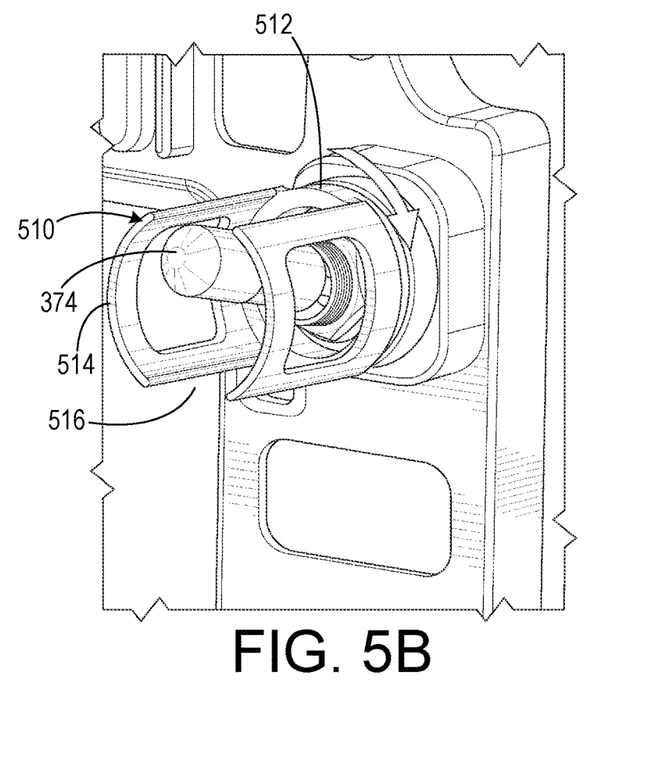

As shown in FIGS. 5A and 5B, the jettison switch 374 may be fitted with a toggle switch guard 510 that is configured to prevent accidental flipping of the jettison switch 374. In one embodiment, the toggle switch guard 510 can include a rotatable body portion 512 from which two wall portions 514 extend. The wall portions 514 define a gap 516 therebetween. When the body portion 512 is in the position shown in FIG. 5A, the gap 516 is transverse to the direction of jettison switch 374 movement and, thus, the wall portions 514 prevent accidental contact with the jettison switch 374. When the body portion 512 is rotated to the position shown in FIG. 5B, the gap 516 is aligned with the direction of switch movement so as to allow the pilot's finger to flip the jettison switch 374.

In one representative embodiment, the control unit includes a programmer for issuing control signals to the first countermeasure dispenser and the second countermeasure dispenser and an electronic circuit that is in communication with the user interface and that is programmed to issue commands corresponding to user choices to the programmer.

In one representative embodiment, the display unit includes a screen that displays graphic representations and wherein the user input device includes a plurality of hard buttons disposed linearly along at least one edge of the screen.

In one representative embodiment, the control unit includes an electronic circuit that is programmed to cause the screen to display a plurality of labels wherein each one of the plurality of labels is disposed adjacent to a different one of the hard buttons and is associated therewith.

In one representative embodiment, the electronic circuit is programmed to display a set of ladder soft keys underneath at least one of the hard buttons when the user presses the hard button, user input device further comprising a user input for selecting one of the ladder soft keys and wherein the electronic circuit is further programmed to take a specific action when one of the set of ladder soft keys is selected by the user.

In one representative embodiment, the control unit includes an electronic circuit that includes a program storage memory that stores a program that controls the electronic circuit and an input for uploading software changes to the program in the program storage so that functionality of the user interface is changeable by changing the program.

In one embodiment, the control unit is in communication with a threat sensor and the display further generates a graphical representation of a threat to the frame.

In one representative embodiment, the graphical representation of threats includes a polar coordinate image that shows a bearing and range of the threat with respect to the frame. In one embodiment, the graphical representation of threats includes in icon that indicates a type of the treat.

In one representative embodiment, the first type of countermeasure can include flares and the second type of countermeasure can include chaff.

In one representative embodiment, the graphic representation of a current loadout of the first countermeasure dispenser comprises a first number representing the current loadout of the first countermeasure dispenser surrounded by a first shape and wherein the graphic representation of a current loadout of the second countermeasure dispenser comprises a second number representing the current loadout of the second countermeasure dispenser surrounded by a second shape that is different from the first shape.

In one representative embodiment, the graphic representation of a plurality of currently-available options for deploying countermeasures includes a number of deployments that are available for each of the currently-available options. The graphic representation of a plurality of currently-available options for deploying countermeasures includes an icon shaped like a cocktail glass associated with at least one of the currently-available options so that a preselected number of the first type of countermeasure and the second type of countermeasure will be deployed when the at least one of the currently-available options is selected by the user. The user interface can include a jettison switch and wherein the electronic circuit is programmed to issue a command that causes jettisoning of all countermeasures when the jettison switch is activated.

Further aspects of one representative embodiment include:
  Primary cockpit interface device in the ALE-47.
  Provides/Routes power to the Programmer and Sequencers
  Accepts discrete inputs from remote controls in the cockpit and outputs discrete signals to remote aircraft devices.
  Communicates with the Programmer over the CDL during normal operation to send or receive status, or to inform the Programmer of switch changes or receipt of an input.
  Issues jettison dispense commands during bypass operation.

Certain representative embodiments will have the following attributes:
  Programmable display with the capability to display, at a minimum, eight (8) user-definable payload categories/type;
  Fully programmable control of all Bypass functions;
  Display of available dispense count per Manual Program;
  Easy aircrew access of payload category/types displays and inhibit switches (final designs will require coordination with Air Crews and Human Factor Engineering);
  Other technological features:
    Long-term adaptability to threat changes;
    Design and BIT improvements for un-commanded dispense reduction;
    Jettison switch improvement;
    A-Kit Backwards compatibility with ALE-47 design;
    Field Tester ALM-288 impacts and potential redesign requirements;
    Improved integration options for future system interfaces;
    Open Architecture; and
    Communication improvements (Ethernet, 1553, TIA-422/485, Fiber).

Chaff and Flares are considered "expendables" in certain embodiments. Expendable decoys may also be controlled.

Certain embodiments can jettison fuel tanks and weapons due to damage or combat and also to release a hung bomb in preparation for landing.

The system can also be programmed to generate repeats of a selected countermeasures cocktail.

While the embodiment disclosed above makes reference to the use of a representative embodiment of the invention on an airframe, it is understood that certain embodiments of the invention could also be employed on other types of combat-specific frames such as land vehicles and ships.

Although specific advantages have been enumerated above, various embodiments may include some, none, or all of the enumerated advantages. Other technical advantages may become readily apparent to one of ordinary skill in the art after review of the following figures and description. It is understood that, although representative embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above-described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A countermeasures control interface for
  use in deploying countermeasures from a frame in response to commands from a user in which the countermeasures are deployed from
  a first countermeasure dispenser that deploys a first type of countermeasure and
  a second countermeasure dispenser that deploys a second type of countermeasure that is different from the first type of countermeasure in which the first countermeasure dispenser and the second countermeasure dispenser are selectively activated by a control unit,
  the countermeasures control interface comprising:
  (a) a programmable user interface, in communication with the control unit, that receives the commands from the user regarding deployment of the countermeasures, the user interface including:
    (i) a display that shows a plurality of user-selectable image formats, in which at least one of the user-selectable image formats includes a graphic representation of a current loadout of the first countermeasure dispenser, a graphic representation of a current loadout of the second countermeasure dispenser and a graphic representation of a plurality of currently-available options for deploying countermeasures, wherein the display includes a screen that displays graphic representations and wherein the user input device includes a plurality of hard buttons disposed linearly along at least one edge of the screen; and (ii) a user input device that receives input regarding a countermeasure deployment choice from the user and generates a signal corresponding to the countermeasure deployment choice; and (b) an electronic circuit that controls the display so as to generate the plurality of user-selectable image formats and that receives the signal corresponding to the countermeasure deployment choice from the user interface and that selectively activates both the first countermeasure dispenser and the second countermeasure dispenser so as to cause deployment of the countermeasures according to the countermeasure deployment choice, wherein the electronic circuit is programmed to cause the screen to display a plurality of labels wherein each one of the plurality of labels is disposed adjacent to a different one of the hard buttons and is associated therewith, wherein the electronic circuit is further programmed to display a set of ladder soft keys underneath at least one of the hard buttons when the user presses the hard button, user input device further configured to receive a user input for selecting one of the ladder soft keys and wherein the electronic circuit is further programmed to take a specific action when one of the set of ladder soft keys is selected by the user.

2. The countermeasures control interface of claim 1, wherein the electronic circuit includes a program storage memory that stores a program that controls the electronic circuit and an input for uploading software changes to the program in the program storage so that functionality of the user interface is changeable by changing the program.

3. The countermeasures control interface of claim 1, wherein the control interface is in communication with a threat sensor and wherein the display further generates a graphical representation of any threats to the frame.

4. The countermeasures control interface of claim 3, wherein the graphical representation of threats includes a polar coordinate image that shows a bearing and range of the threat with respect to the frame.

5. The countermeasures control interface of claim 3, wherein the graphical representation of threats includes in icon that indicates a type of the threat.

6. The countermeasures control interface of claim 1, wherein the first type of countermeasure comprises flares and wherein the second type of countermeasure comprises chaff.

7. The countermeasures control interface of claim 1, wherein the graphic representation of a current loadout of the first countermeasure dispenser comprises a first number representing the current loadout of the first countermeasure dispenser surrounded by a first shape and wherein the graphic representation of a current loadout of the second countermeasure dispenser comprises a second number representing the current loadout of the second countermeasure dispenser surrounded by a second shape that is different from the first shape.

8. The countermeasures control interface of claim 1, wherein the graphic representation of a plurality of currently-available options for deploying countermeasures includes a number of deployments that are available for each of the currently-available options.

9. The countermeasures control interface of claim 1, wherein the graphic representation of a plurality of currently-available options for deploying countermeasures includes an icon shaped like a cocktail glass associated with at least one of the currently-available options so that a preselected number of the first type of countermeasure and the second type of countermeasure will be deployed when the at least one of the currently-available options is selected by the user.

10. The countermeasures control interface of claim 1, wherein the user interface comprises a jettison switch and wherein the electronic circuit is programmed to issue a command that causes jettisoning of all countermeasures when the jettison switch is activated.

11. The countermeasures control interface of claim 1, wherein the frame includes a programmer for issuing control signals to the first countermeasure dispenser and the second countermeasure dispenser and wherein the electronic circuit is in communication with the user interface and is programmed to issue commands corresponding to user choices to the programmer.

12. A countermeasures device for deploying counter measures from a frame in response to commands from a user, comprising:

(a) a first countermeasure dispenser mounted on the frame and configured to deploy a first type of countermeasure;

(b) a second countermeasure dispenser mounted on the frame and configured to deploy a second type of countermeasure that is different from the first type of countermeasure;

(c) a control unit that selectively activates both the first countermeasure dispenser and the second countermeasure dispenser; and (d) a user interface, in communication with the control unit, that receives the commands from the user regarding deployment of the countermeasures, the user interface including:

(i) a display that shows a plurality of user-selectable image formats, in which at least one of the user-selectable image formats includes a graphic representation of a current loadout of the first countermeasure dispenser, a graphic representation of a current loadout of the second countermeasure dispenser and a graphic representation of a plurality of currently-available options for deploying countermeasures, wherein the display comprises a screen that displays graphic representations and wherein the user input device comprises a plurality of hard buttons disposed linearly along at least one edge of the screen; and (ii) a user input device that receives input regarding a countermeasure deployment choice from the user and that generates a signal corresponding to the countermeasure deployment choice to the control unit, wherein the control unit controls the display so as to generate the graphic representation wherein the control unit includes an electronic circuit that is programmed to cause the screen to display a plurality of labels wherein each one of the plurality of labels is disposed adjacent to a different one of the hard buttons and is associated therewith, and wherein the electronic circuit is further programmed to display a set of ladder soft keys underneath at least one of the hard buttons when the user presses the hard button, user input device further configured to receive a user input for selecting one of the ladder soft keys and wherein the electronic circuit is further programmed to take a specific action when one of the set of ladder soft keys is selected by the user.

13. The countermeasures device of claim 12, wherein the control unit comprises:
   (a) a programmer for issuing control signals to the first countermeasure dispenser and the second countermeasure dispenser; and
   (b) an electronic circuit that is in communication with the user interface and that is programmed to issue commands corresponding to user choices to the programmer.

14. The countermeasures device of claim 12, wherein the control unit includes an electronic circuit that includes a program storage memory that stores a program that controls the electronic circuit and an input for uploading software changes to the program in the program storage so that functionality of the user interface is changeable by changing the program.

15. The countermeasures device of claim 12, wherein the control unit is in communication with a threat sensor and wherein the display further generates a graphical representation of a threat to the frame.

16. The countermeasures device of claim 15, wherein the graphical representation of threats includes a polar coordinate image that shows a bearing and range of the threat with respect to the frame.

17. The countermeasures device of claim 15, wherein the graphical representation of threats includes in icon that indicates a type of the threat.

18. The countermeasures device of claim 12, wherein the first type of countermeasure comprises flares and wherein the second type of countermeasure comprises chaff.

19. The countermeasures device of claim 12, wherein the graphic representation of a current loadout of the first countermeasure dispenser comprises a first number representing the current loadout of the first countermeasure dispenser surrounded by a first shape and wherein the graphic representation of a current loadout of the second countermeasure dispenser comprises a second number representing the current loadout of the second countermeasure dispenser surrounded by a second shape that is different from the first shape.

20. The countermeasures device of claim 12, wherein the graphic representation of a plurality of currently-available options for deploying countermeasures includes a number of deployments that are available for each of the currently-available options.

21. The countermeasures device of claim 12, wherein the graphic representation of a plurality of currently-available options for deploying countermeasures includes an icon shaped like a cocktail glass associated with at least one of the currently-available options so that a preselected number of the first type of countermeasure and the second type of countermeasure will be deployed when the at least one of the currently-available options is selected by the user.

22. The countermeasures device of claim 12, wherein the user interface comprises a jettison switch and wherein the electronic circuit is programmed to issue a command that causes jettisoning of all countermeasures when the jettison switch is activated.

\* \* \* \* \*